July 22, 1941.  C. T. ASHBY  2,250,288
REFRIGERATION
Filed Dec. 3, 1936
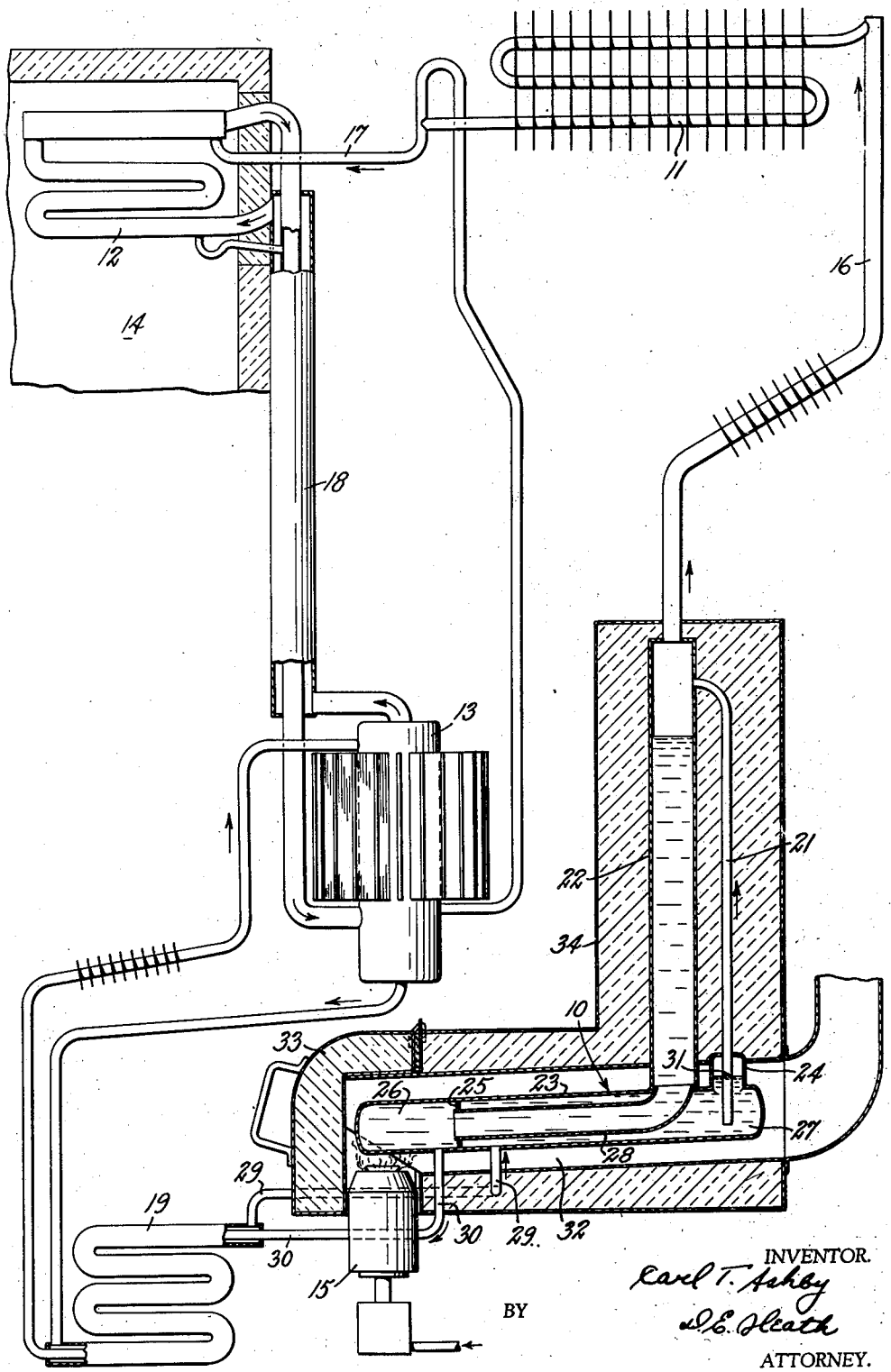
INVENTOR.
Carl T. Ashby
D. E. Heath
BY
ATTORNEY.

Patented July 22, 1941

2,250,288

UNITED STATES PATENT OFFICE 2,250,288

REFRIGERATION

Carl T. Ashby, Evansville, Ind., assignor to Servel, Inc., New York, N. Y., a corporation of Delaware Application December 3, 1936, Serial No. 113,979

6 Claims. (Cl. 62—119.5)

My invention relates to absorption type refrigeration apparatus and it is an object of the invention to provide in such apparatus an improved generator or boiler structure for better utilization of combustion heat as will appear from the following description and accompanying drawing in which the single figure shows schematically a refrigeration system embodying the invention.

The system illustrated is generally like that described in Patent 2,037,782 to William R. Hainsworth and is made up of a number of steel vessels and pipes welded together to form an hermetically sealed system. All the spaces of the system are in open and unrestricted communication so that all parts are at the same total pressure. The system contains hydrogen and a water solution of ammonia. Other suitable fluids may be used. The parts of the system include a generator 10, a condenser 11, an evaporator 12, and an absorber 13. The evaporator 12 is located in a refrigerator storage compartment 14. The condenser 11 and the absorber 13 are cooled by air. The generator 10 is heated by a kerosene burner 15 in a manner hereinafter described. Other suitable heaters utilizing combustion of fuel may be used, such as, for instance, a gas burner or oil burner.

Briefly, the operation of the system is as follows:

Ammonia vapor expelled from solution by heat in generator 10 flows through a conduit 16 to the condenser 11 where the ammonia vapor is condensed to liquid. The liquid ammonia flows from the condenser through a conduit 17 into the evaporator 12. Hydrogen circulates through and between the evaporator 12 and the absorber 13 by way of a gas heat exchanger 18. In the evaporator the liquid ammonia evaporates and diffuses into the hydrogen, producing a refrigeration effect. In the absorber 13 ammonia vapor is absorbed out of the rich gas by weakened absorption solution. The gas circulation between the evaporator and the absorber occurs as the result of the difference in weights of the columns of rich and weak gas, the column of gas flowing from the evaporator to the absorber, and containing the greater amount of the heavier ammonia vapor, being heavier than the column of weak gas flowing from the absorber to the evaporator. The absorption solution is circulated through and between the generator 10 and the absorber 13 by way of a liquid heat exchanger 19 and circulation of the solution is caused by the lifting action of vapor formed in a chamber 27 of the generator which raises liquid through a riser 21 into the generator standpipe 22 where the liquid level is such that solution overflows therefrom into the absorber.

Referring now more particularly to the generator 10, a substantially horizontal portion 23 is formed by a horizontally elongated closed cylindrical vessel provided at one end with a vapor dome 24 and near the other end with an internal partition 25 dividing the vessel 23 into a chamber 26 and a second chamber 27. The lower end of the standpipe 22 is connected by a conduit 28 to the chamber 26. The conduit 28 is shown located inside of the horizontal vessel 23 for the purpose of conserving heat but it may be located outside. A conduit 29 is connected to the chamber 27 for conducting enriched absorption solution flowing from the absorber through the liquid heat exchanger to the generator. Chamber 27 is therefore referred to as the strong solution chamber. A conduit 30 is connected to the chamber 26 for conducting weakened solution from the generator toward the absorber. Chamber 26 is therefore referred to as the weak solution chamber. The strong solution chamber 27 is connected by the riser 21 to the upper part of the standpipe 22. The lower end of the riser 21 projects downward through the dome 24 and into the chamber 27, the riser being open at its lower end in this chamber. The lower part of the riser 21 is provided with a hole 31 within the dome 24. The horizontal portion of the generator is surrounded by a casing forming a flue 32. The forward or burner end of the casing forming the flue 32 is open at the bottom beneath the forward end of the weak solution chamber 26. The burner 15 is located directly beneath the forward end of the weak liquid chamber 26 and a removable heat insulated hood 33 provides a passage for heat from the burner into the forward end of the flue 32. The generator is suitably insulated, as by mineral wool retained by a sheet metal casing 34.

The weak liquid chamber 26 being directly over the burner 15 receives heat directly from the burner by radiation in addition to being heated, as is the remainder of the horizontal portion of the generator, by the hot flue gases created by combustion at the burner. By thus placing the weak liquid chamber 26 directly in line with the burner flame and thus transferring radiant heat directly from the burner to this chamber, there is obtained greater efficiency between the burner and the generator.

Various changes and modifications may be made within the scope of the invention which is not limited to the embodiment shown and described but only as indicated in the following claims.

What is claimed is:

1. Absorption refrigeration apparatus including a generator having a horizontally elongated portion, a partition forming a weak solution chamber in one end of said portion, a casing forming a flue around said horizontal portion, a burner arranged so that the flame is projected upwardly into one end of said flue, and said weak solution chamber being located directly above said burner.

2. An absorption refrigeration system having a plurality of portions which receive heat for causing refrigerant vapor to be expelled from absorption liquid contained in said portions, said heat receiving portions being located substantially side by side in a horizontal line, an upright liquid fuel burner, means forming a passage for transfer of heat from said upright liquid fuel burner to said heat receiving portions, one of said heat receiving portions being located so that it absorbs heat transferred thereto directly by radiation from the burner, and connections for flow of absorption liquid first through another of said heat receiving portions and then through said heat receiving portion subjected to radiant heat from the burner.

3. An absorption refrigeration system as set forth in claim 2 in which said passage forming means is a substantially horizontal flue surrounding said heat receiving portions, and said heat receiving portion which is subjected to radiant heat from the burner is located directly above the burner in the lower end of said flue.

4. An absorption refrigeration system as set forth in claim 2 in which said connections include a standpipe projecting above said heat receiving portions of the system, and a conduit from said standpipe to said one heat receiving portion, which conduit extends through absorption liquid in another of said heat receiving portions to effect conservation of heat.

5. An absorption refrigeration system as set forth in claim 2 in which said passage forming means is a flue encompassing said heat receiving portions of the system, said burner is a kerosene burner, and said one heat receiving portion of the system is located directly over said kerosene burner at the lower end of said flue.

6. An absorption refrigeration system having a plurality of portions which receive heat by which refrigerant vapor is expelled from absorption liquid contained in said portions, and conduit means providing connections for flow of absorption liquid from a first of said heat receiving portions to a second of said heat receiving portions so that liquid in said second heat receiving portion is at a lower concentration, and vapor is expelled therefrom at a higher temperature than in said first heat receiving portion, said conduit means also providing conduits for conducting vapor from said heat receiving portions, the conduit for conducting vapor from said second heat receiving portion extending through absorption liquid in said first heat receiving portion for conservation of heat.

CARL T. ASHBY.